(12) United States Patent
Sato et al.

(10) Patent No.: US 8,315,140 B2
(45) Date of Patent: Nov. 20, 2012

(54) OPTICAL PICKUP APPARATUS

(75) Inventors: Minoru Sato, Ota (JP); Kiyotaka Eizumi, Oizumi-machi (JP); Chiaki Asakawa, Oizumi-machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 25 days.

(21) Appl. No.: 12/839,903

(22) Filed: Jul. 20, 2010

(65) Prior Publication Data
US 2011/0170397 A1    Jul. 14, 2011

(30) Foreign Application Priority Data
Jul. 24, 2009   (JP) .................................. 2009-172815

(51) Int. Cl.
*G11B 7/00* (2006.01)
(52) U.S. Cl. .......... 369/112.16; 369/112.17; 369/112.29
(58) Field of Classification Search ............. 369/112.16, 369/112.17, 112.29
See application file for complete search history.

(56) References Cited

U.S. PATENT DOCUMENTS 5,124,868 A * 6/1992 Matsubayashi et al. . 369/110.04
2008/0304394 A1* 12/2008 Kikuhara et al. ........ 369/112.16

FOREIGN PATENT DOCUMENTS
JP        2008-251112       10/2008

* cited by examiner

*Primary Examiner* — Latanya Bibbins
(74) *Attorney, Agent, or Firm* — SoCal IP Law Group LLP; Steven C. Sereboff; John E. Gunther

(57) ABSTRACT

An optical pickup apparatus comprising: a laser light source configured to emit a laser beam; an objective lens configured to apply the laser beam to an optical recording medium; and a beam splitter including a first reflective film configured to reflect the laser beam so as to be directed to the objective lens, the beam splitter interposed in an optical path between the laser light source and the objective lens, an incidence polarization angle of the laser beam relative to the first reflective film being set such that a P-polarization component is greater than an S-polarization component in linear polarization components of the laser beam incident on the first reflective film.

6 Claims, 6 Drawing Sheets

| WAVELENGTH | PHASE DIFFERENCE CAUSED BY REFLECTIVE LAYER OF BEAM SPLITTER | PHASE DIFFERENCE CAUSED BY REFLECTIVE LAYER OF RAISING REFLECTIVE MIRROR | COMBINED PHASE DIFFERENCE |
|---|---|---|---|
| 660nm | 17.80(deg) | −107.80(deg) | −90.00(deg) |
| 784nm | 34.26(deg) | −124.26(deg) | −90.00(deg) |

OPTICAL PICKUP APPARATUS

CROSS-REFERENCE TO RELATED APPLICATION

This application claims the benefit of priority to Japanese Patent Application No. 2009-172815, filed Jul. 24, 2009, of which full contents are incorporated herein by reference.

BACKGROUND OF THE INVENTION

1. Field of the Invention

The present invention relates to an optical pickup apparatus that is configured to reflect a laser beam emitted from a laser light source with a reflective film of a beam splitter, thereafter, bring the laser beam to an objective lens, and apply the laser beam to an optical recording medium and, more particularly, to an optical pickup apparatus that converts a linearly polarized laser light emitted from a laser light source into circularly polarized light, to be applied to an optical recording medium.

2. Description of the Related Art

In an optical pickup apparatus that optically records and reproduces a signal, using a laser beam, to/from an optical recording medium such as an optical disc of a DVD (Digital Versatile Disc) or a CD (Compact Disc), such a type of the apparatus is known that supports, using a single optical pickup apparatus, a DVD and a CD having different recording densities from each other.

Such an optical pickup apparatus that supports a DVD and a CD includes a laser light source that emits a laser beam having a red wavelength band of 645 to 675 nm suitable for a DVD and that also emits a laser beam having an infrared wavelength band of 765 to 805 nm suitable for a CD, and switches a laser beam to be used depending on the optical disc.

The laser light source is generally configured by a semiconductor laser of a laser diode, and a multi-laser unit is more often employed that is formed by incorporating, in a single package, laser-beam emitting points emitting laser beams having different wavelengths in such a manner that those laser-beam emitting points are configured in a single laser chip or those laser-beam emitting points each are separately configured in an individual laser chip and the chips are installed in the same semiconductor base.

An optical pickup apparatus that supports a DVD and a CD uses an objective lens whose incidence plane has an annular diffraction grating formed thereon, corrects spherical aberration with respect to each of the optical discs, i.e., a DVD and a CD, by diffraction by the diffraction grating of each of the laser beams having a wavelength suitable for each of the optical discs, and thereby, secures the quality of the laser beams applied to the optical discs and allows the single objective lens to support the optical discs.

In the optical pickup apparatus supporting a DVD and a CD, the optical path may be simplified by employing the above-described multi-laser unit and single objective lens.

On the other hand, an optical pickup apparatus exists that supports the Blu-ray Disc (trademark) (hereinafter referred to as BD) standard using a laser beam having a blue-violet wavelength band of 400 to 420 nm (405 nm, for example).

Such a BD-support pickup apparatus includes optical systems for a DVD and a CD in addition to an optical system for reproduction (and recording) for a BD, since a BD apparatus supports reproduction (and recording) for a DVD and a CD.

Therefore, preferably, the BD-support optical pickup apparatus has such a configuration that the optical systems for a DVD and a CD are simplified or made compact, since a plurality of optical parts of the optical systems are incorporated in the BD-support optical pickup apparatus.

In an optical pickup apparatus, a laser beam applied to a signal layer of an optical disc is converted into a circularly polarized light, and thus, adverse effects caused by birefringence in a transparent substrate resin of the optical disc are reduced and the quality of the laser beam reflected by the optical disc is improved.

A semiconductor laser, which is a laser light source of an optical pickup apparatus used for recording/reproducing to/from an optical disc, emits a linearly polarized light due to the structure of the semiconductor laser. Therefore, the optical pickup apparatus needs a quarter-wave plate, which causes a phase difference of a quarter wavelength in the laser beam emitted from the laser light source, in order to convert the laser beam to be applied to the optical disc into a circularly polarized light.

With the quarter-wave plate, the optical pickup apparatus may cause the direction of the linear polarization of the laser beam in the outward path that brings the laser beam from the laser light source to the optical disc and the direction in the return path that brings the laser beam reflected by the optical disc to a photodetector, to differ from each other by 90 degrees. Therefore, the utilization efficiency of the laser beam may be increased using a polarizing beam splitter, so that the laser light source and the photodetector may separately be disposed each in a different optical path.

In an optical pickup apparatus that includes two laser light sources supporting a DVD and a CD which uses the laser beams having wavelengths different from each other, that brings laser beams respectively emitted from the laser light sources to a common optical path, and that allows the laser beams to support the optical discs, respectively, through a common objective lens, such a configuration is known in which the laser beams having wavelengths supporting a DVD and a CD are converted into circularly polarized light by allowing a raising reflective mirror, disposed before an objective lens in an outward path, to have a function of a quarter-wave plate, and the circularly polarized light is applied to the optical discs (see Japanese Patent Application Laid-Open Publication No. 2008-251112).

The optical pickup apparatus described in the above publication has advantages in reduction in the number of assembling processes and downsizing since the number of optical parts thereof is reduced by allowing the raising reflective mirror to have a function of a quarter-wave plate. However, a phase difference of a quarter wavelength is required to be caused in each of the laser beams having wavelengths supporting a DVD and a CD using the raising reflective mirror.

In order to cause the phase difference of a quarter wavelength by the raising reflective mirror, the optical pickup apparatus allows a laser beam incident on the raising reflective mirror to make incident on the raising reflective mirror such that the direction of the linear polarization of the incident laser beam forms a rotation angle of 45 degrees relative to the direction of the inclination of the reflecting surface, that is, a P-polarization component and an S-polarization component of the laser beam become equal to each other. Thus, the optical pickup apparatus causes the desired phase difference of a quarter wavelength in each of the laser beams having wavelengths that support a DVD and a CD using the raising reflective mirror.

However, in the above-described optical pickup apparatus, a single raising reflective mirror is required to have a function of causing a phase difference of a wide-band quarter-wave plate supporting the laser beams having wavelengths that support a DVD and a CD. Therefore, it is difficult to form a reflective film that supports both the reflectance and the phase difference function of the reflective mirror, or it is necessary that a phase difference film of the wide-band quarter-wave plate is not formed on the reflecting surface of the reflective mirror by coating but the phase difference film is formed by bonding that is disadvantageous in terms of surface accuracy and cost. Therefore, it may be considered to allow not only the reflective mirror but in another optical part to have a phase difference function without proving any dedicated wave plate.

The raising reflective mirror is used to reduce thickness of an optical pickup apparatus, and thus, the raising reflective mirror may not be included in an optical layout depending on the optical pickup apparatus. Therefore, it is desired for an optical part other than a raising reflective mirror to have the phase difference function without providing any dedicated wave plate.

When total reflection is caused as in the case of the reflective mirror, such a reflective film may be formed that reflectance thereof for S polarized light becomes substantially equal to reflectance thereof for P polarized light when a laser beam is incident thereon at a rotation angle of 45 degrees.

However, it has been turned out that as to a beam splitter, etc., including such a reflective film that a laser beam is not totally reflected thereby but a laser beam is reflected thereby and also passes therethrough, in the case where a phase difference is tried to be caused using the reflective film, when the laser beam is incident on a reflecting surface such that the direction of the linear polarization of a laser beam is set to form a rotation angle of 45 degrees relative to the direction of the inclination of a reflecting surface, the reflective film can not cause a desired phase difference.

When the reflective film does not cause total reflection, the reflectance thereof for the P-polarized light is smaller than that for the S-polarized light according to the physical law of the relationship between the incidence angle and the reflectance with respect to the S-polarized light and the P-polarized light. Therefore, according to the reflection characteristic of the reflective film formed on the beam splitter, the reflectance thereof for the P-polarized light is smaller than that for the S-polarization due to the incidence angle of the laser beam. Thus, when a laser beam is incident on the beam splitter at a rotation angle of 45 degrees relative to the direction of the inclination of the reflecting surface such that the P-polarization component and the S-polarization component of the laser beam are equal, the phase difference caused on the reflective film does not accurately become a quarter wavelength (90 degrees) due to the characteristic that the reflectance thereof for the P-polarized light and that for the S-polarization differ from each other on the reflective film. As a result, such a problem arises that the laser beam reflected by the reflective film does not become circularly polarized light.

SUMMARY OF THE INVENTION

An optical pickup apparatus according to an aspect of the present invention, comprises: a laser light source configured to emit a laser beam; an objective lens configured to apply the laser beam to an optical recording medium; and a beam splitter including a first reflective film configured to reflect the laser beam so as to be directed to the objective lens, the beam splitter interposed in an optical path between the laser light source and the objective lens, an incidence polarization angle of the laser beam relative to the first reflective film being set such that a P-polarization component is greater than an S-polarization component in linear polarization components of the laser beam incident on the first reflective film.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
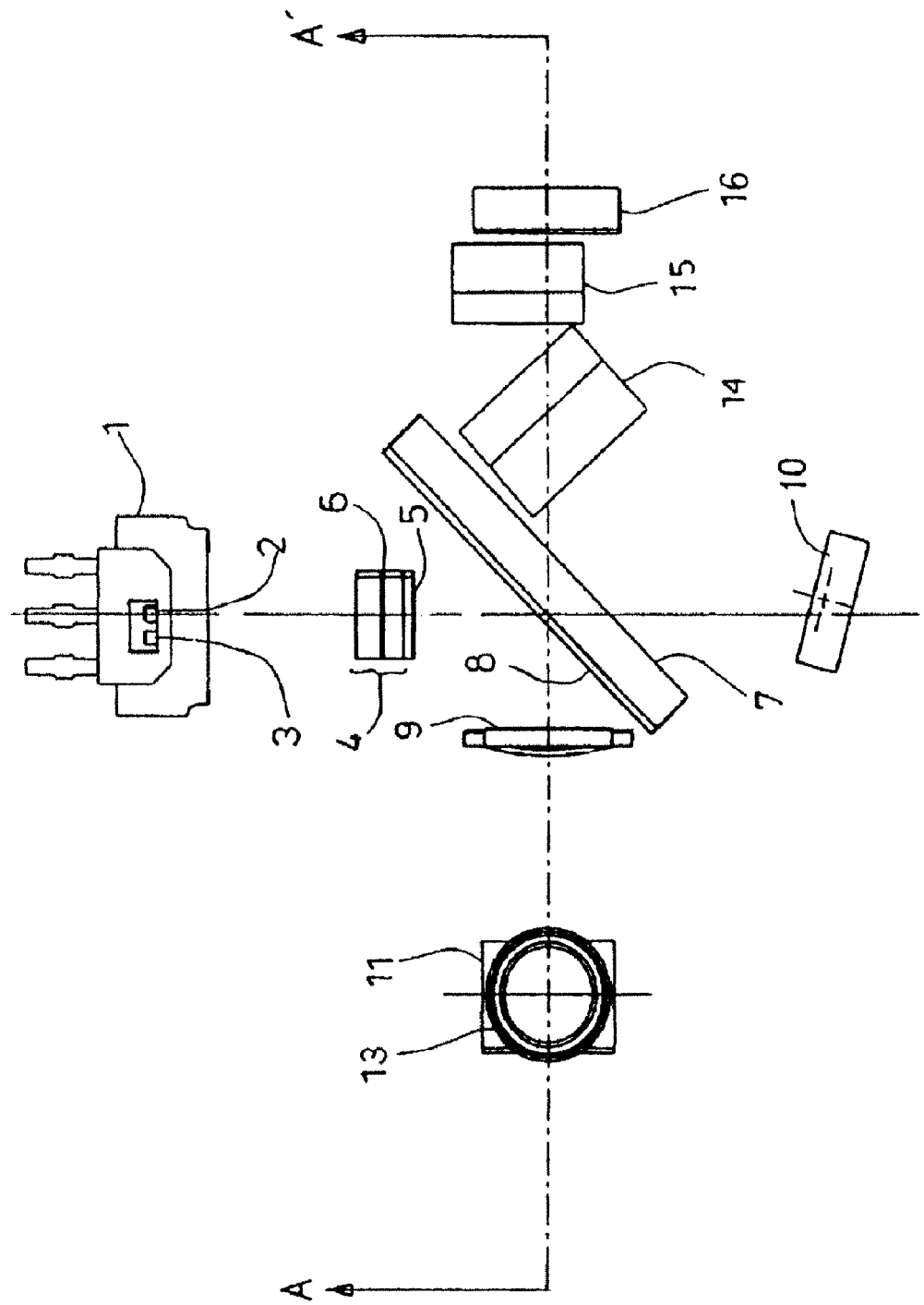
FIG. 1 is a plan view of an optical arrangement of an optical pickup apparatus according to an embodiment of the present invention.

At least the following details will become apparent from descriptions of this specification and of the accompanying drawings.

In an optical pickup apparatus according to an embodiment of the present invention having a configuration in which a laser beam emitted from a laser light source is reflected by a reflective film of a beam splitter, and thereafter, the laser beam is brought to an objective lens, to be applied to an optical recording medium; the direction of linear polarization of the laser beam incident on the reflective film of the beam splitter is set such that a P-polarization component becomes greater than an S-polarization component. Therefore, such a characteristic that the reflectance for the P-polarized light is smaller than that for the S-polarized light in the reflective film is compensated, and thus, a desired phase difference is caused by the reflective film so that the laser beam applied to the optical recording medium becomes circularly polarized light.

In an optical pickup apparatus according to an embodiment of the present invention having a configuration in which the laser beam reflected by the reflective film of the beam splitter is brought to the objective lens by bending the optical axis of the laser beam using a reflective mirror, to be applied to the optical recording medium; the direction of the linear polarization of the laser beam incident on the reflective film of the beam splitter is set such that the P-polarization component becomes greater than the S-polarization component, and thus, a phase difference of ±90 degrees ±15 degrees is caused in the laser beam emitted from the laser light source, by both of the reflective film of the beam splitter and a reflective film formed on the reflective mirror, or by only the reflective film of the beam splitter. Therefore, when it is difficult to cause a desired phase difference by the beam splitter alone, the occurrence of the phase difference in the laser wavelength is allowed to become adjustable by using both of the reflective film of the beam splitter and the reflective film of the reflective mirror.

In the optical pickup apparatus according to an embodiment of the present invention, the direction of the linear polarization of the laser beam incident on the reflective film of the beam splitter is set such that the P-polarization component becomes greater than the S-polarization component. Thus, the difference in reflectance between the P-polarized light and the S-polarized light in the reflective film is compensated. Therefore, the optical pickup apparatus is advantageous to cause the laser beam emitted from the objective lens and applied to the optical recording medium, to have a necessary circular polarization ellipticity.

In the optical pickup apparatus according to an embodiment of the present invention, the phase difference of ±90 degrees ±15 degrees is caused in the laser beam emitted from the laser light source using both of the reflective film of the beam splitter and the reflective film formed on the reflective mirror, or using the reflective film of the beam splitter alone. Therefore, when it is difficult to cause a desired phase difference by the beam splitter alone, the occurrence of the phase difference in the laser wavelength is allowed to become adjustable by using both of the reflective film of the beam splitter and the reflective film of the reflective mirror. Therefore, the optical pickup apparatus is advantageous to cause the laser beam applied to the optical recording medium to have a necessary circular polarization ellipticity.

In this case, the phase difference caused by the reflective film of the reflective mirror is set at ±90 degrees ±15 degrees using the phase difference generated by the reflective film of the beam splitter as a reference, and thus, the reflective film of the beam splitter may be formed such that an optical-path splitting function, which is essential for the beam splitter, is given a higher priority. Therefore the optical pickup apparatus is advantageous to set a laser light amount ratio between split optical paths, at a desired design value.

Since a reflectance Rs of the S-polarized light of the laser beam incident on the reflective film of the beam splitter is set at Rs>50%, a reflectance ratio Rp/Rs between the reflectance Rs and a reflectance Rp of the P-polarized light of the laser beam is set at Rp/Rs<1.00, and the reflectance Rp/Rs is also set at Rp/Rs≧0.24; such an optical pickup apparatus may be provided as to secure a necessary light amount for recording of a laser beam applied to an optical recording medium.

The direction of the linear polarization of the laser beam incident on the reflective film of the beam splitter is set so as to be inclined at an angle of 26 to 44 degrees relative to the direction of the inclination of the reflecting surface of the reflective film, and therefore, such an optical pickup apparatus may be provided that secures the necessary circular polarization ellipticity of the laser beam emitted from the objective lens to be applied to an optical recording medium.

The laser light source includes a first and a second laser-beam emitting points that respectively emit a first laser beam and a second laser beam respectively having a first wavelength a second wavelength different in wavelength from each other. The first and the second laser beams are incident on the reflective film of the beam splitter, and the first and the second laser beams that are reflected by the optical recording medium and that are returned to the beam splitter are allowed to pass through the reflective film, to be brought to a photodetector. Therefore, an efficient optical layout is enabled.

Since the optical layout is such that a portion of each of the first and the second laser beams passing through the reflective film of the beam splitter is received by a front monitor light-receiving detector, the single front monitor light-receiving detector may be used for both of the first and the second laser beams. Therefore, an efficient optical layout is enabled.

<First Embodiment>

Figure 2:
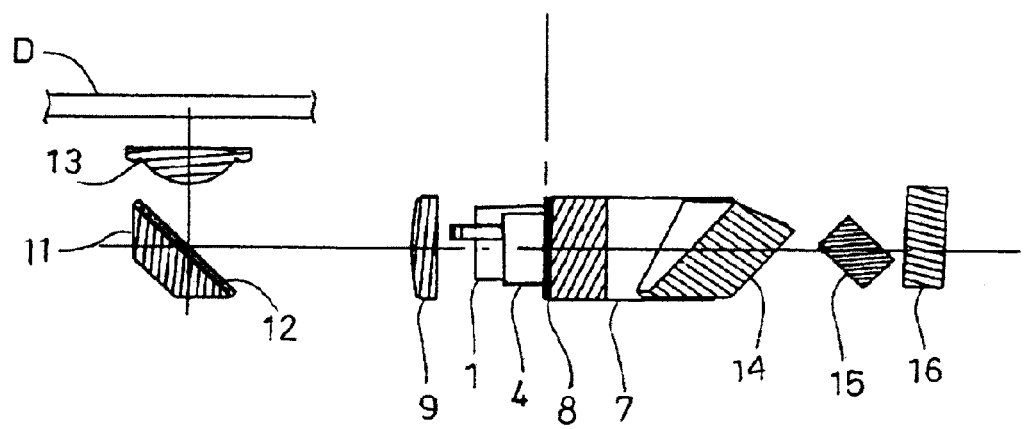
FIG. 2 is a cross-sectional view of an optical arrangement along a line A-A' in FIG. 1.

FIG. 1 is a plan view of an optical arrangement of an optical pickup apparatus according to an embodiment of the present invention. FIG. 2 is a cross-sectional view of an optical arrangement along a line A-A' in FIG. 1.

The optical pickup apparatus illustrated in the figures has a configuration that supports recording/reproducing for a DVD as well as supports recording/reproducing for a CD.

A laser unit 1, which is a so-called multi-laser unit, is formed on a same semiconductor substrate using a laser chip in which laser diodes are configured with a first laser beam emitting point 2 and a second laser beam emitting point 3, respectively. Through the first laser beam emitting point 2, a first laser beam is generated which has a first wavelength in a red wavelength band of 645 to 675 nm suitable for a DVD such as 660 nm, and through a second laser beam emitting point 3, a second laser beam is generated which has a second wavelength in an infrared wavelength band 765 to 805 nm suitable for a CD such as 784 nm. The laser unit 1 emits a laser beam having two wavelengths that is adapted to recording and reproducing to/from a CD and a DVD.

A laser beam selectively emitted from each of the first and the second laser beam emitting points 2 and 3 of the laser unit 1 is incident on a composite optical element 4. The composite optical element 4 includes a diffraction grating 5 that has a diffraction function effective for the laser wavelengths of the laser beams generated from the first and the second laser beam emitting points 2 and 3, and splits each of the laser beams into three beams that are a zero-order diffracted light beam and ±first-order diffracted beams.

The composite optical element 4 includes a half-wave plate 6. The half-wave plate 6 has a function of setting the orientation of the direction of the linear polarization of each of the laser beams generated from the first and the second laser beam emitting points 2 and 3, to be an appropriate rotation angle relative to a reflective film 8 of a beam splitter 7, as well as a function of suppressing return light that returns to the laser unit 1.

The laser beams having passed through the composite optical element 4 are reflected by the reflective film 8 of the beam splitter 7 that is a plate type and is disposed at an inclination of 45 degrees relative to the laser beams, to be incident on a collimating lens 9. Due to the film characteristic of the reflective film 8, the beam splitter 7 has a portion of each of the laser beams passed therethrough, which have passed through the composite optical element 4, to be brought to a front monitor light-receiving detector 10, and reflects the remaining portion of each of the laser beams which do not pass therethrough, to be brought to a main optical path.

The reflective film 8 of the beam splitter 7 is formed using a semi-transmission mirror that has polarization dependency, and splits the amount of laser light into the amount thereof to be reflected therefrom and the amount thereof to pass therethrough at a predetermined laser light amount ratio according to the film characteristic of the reflective film 8.

When the amount of laser light is sufficient in the laser beam generated from each of the first and the second laser beam emitting points 2 and 3 of the laser unit 1, a semi-transmission mirror may be employed as the reflective film 8, and thus, it becomes easy to design and form the reflective film 8 and the cost of the beam splitter 7 may be reduced. In this case, the semi-transmission mirror characteristic of the reflective film 8 does not need to be set such that the amount of laser light to be reflected therefrom and the amount thereof to pass therethrough are equalized, and is set taking into account the amount of laser light reaching the optical disc and the amount of laser light received by a photodetector 16.

In the above, the direction of the linear polarization of each of the first and the second laser beams incident on the reflective film 8 of the beam splitter 7 is set such that a P-polarization component is greater than an S-polarization component by allowing the angle, at which the direction of the linear polarization is inclined relative to the direction of the inclination of the reflecting surface of the reflective film 8 and the P-polarization component and the S-polarization component are equal, to be set smaller than 45 degrees. For example, the angle at which the direction of the linear polarization is inclined relative to the direction of the inclination of the reflecting surface of the reflective film 8 is set at 42 degrees. Such setting of the angle, at which the direction of the linear polarization is inclined in the laser beams incident on the reflective film 8, will be described later in detail.

According to the spectral characteristic of the reflective film 8 of the beam splitter 7, the reflectance Rs is set at 92% and a transmittance Ts is set at 8% for the S-polarized light of the laser beam incident thereon, and the reflectance Rp is set at 73% and transmittance Tp is set at 27% for the P-polarized light of the laser beam incident thereon, for example.

Split light amounts of the laser beam reflected by the reflective film 8 of the beam splitter 7 and the laser beam passing through the reflective film 8 are determined according to the spectral characteristic of the reflective film 8 and the orientation of the direction of the linear polarization of a laser beam incident on the reflective film 8.

In the first or the second laser beam incident on the reflective film 8 of the beam splitter 7, a portion of the laser beam, at most smaller than 50% thereof, preferably smaller than or equal to 20% thereof, for example, 7 to 10% thereof in light amount passes through the reflective film 8 to be brought to the front monitor light-receiving detector 10, and a portion of the laser beam, at least greater than 50% thereof, preferably greater than or equal to 80% thereof, for example, 90 to 93% thereof in light amount is reflected by the reflective film 8 to be brought to the main optical path.

The laser beam reflected by the reflective film 8 of the beam splitter 7 is brought to the collimating lens 9. The collimating lens 9 collimates the laser beam having the wavelength compatible with a DVD into parallel light, and narrows the divergence angle of the laser beam having the wavelength compatible with a CD. The laser beam having passed through the collimating lens 9 is reflected by a reflective film 12 of a raising reflective mirror 11, and the optical axis thereof is bent, so that this optical axis becomes substantially perpendicular to the optical axis of each of the laser beams emitted from the laser unit 1 and the optical axis of a reflected light from a disc D to be received by the photodetector 16. The laser beam is then incident on an objective lens 13.

The objective lens 13 has an annular diffraction structure whose center is the optical axis and which is formed on an incidence face thereof; supports two wavelengths being designed such that a predetermined order diffracted light is condensed with spherical aberration properly corrected for the thickness of the transparent substrate layer of the optical disc D, which is a DVD or a CD, by the diffractive action by this diffraction structure; and is designed to have an NA (Numerical Aperture) of 0.65 for the laser beam having the wavelength compatible with a DVD and an NA of 0.51 for the laser beam having the wavelength compatible with a CD.

Therefore, the laser beam having the wavelength compatible with a DVD emitted from the first laser light source 2 is condensed by the objective lens 13 being adapted to the thickness of the transparent substrate layer of a DVD and is applied to a signal layer of a DVD. The laser beam having the wavelength compatible with a CD emitted from the second laser light source 3 is condensed by the objective lens 13 being adapted to the thickness of the transparent substrate layer of a CD and is applied to a signal layer of a CD.

With such an optical system, the laser beam having the wavelength compatible with a DVD and the laser beam having the wavelength compatible with a CD, that are generated from the first and the second laser light sources 2 and 3 of the laser unit 1 are incident on a single objective lens 13, and the objective lens 13 is driven in a focusing direction and a tracking direction. Thus, the laser beams are focused on the signal layer of the optical disc D, which is a DVD or a CD, and are applied to follow a predetermined signal track.

Phase differences occur corresponding to the laser wavelengths of the first and the second laser beams reflected by the reflecting film 8 of the beam splitter 7, respectively, while phase differences occur corresponding to the laser wavelengths in the first and the second laser beams reflected by the reflective film 12 of the raising reflective mirror 11, respectively. The phase characteristics of the reflective film 8 of the beam splitter 7 and the reflective film 12 of the reflective mirror 11 are respectively set such that each of the phase differences of the first and the second laser beams becomes substantially a quarter wavelength (90 degrees) by combining the phase difference caused by the reflective film 8 of the beam splitter 7 and the phase difference caused by the reflective film 12 of the reflective mirror 11. Therefore, a necessary circular polarization ellipticity is secured of each of the first the second laser beams to be applied to the optical disc D.

The laser beam applied to the signal layer of the optical disc D is modulated and reflected by the signal layer, to be returned to the objective lens 12, and is further returned to the beam splitter 7 in the optical path in a direction opposite to a direction in which the beam has traveled. The laser beam returned to the beam splitter 7 passes through the beam splitter 7, then passes through a first plate 14 for adding an astigmatism which is a focus error component of the laser beam applied to the optical disc D, further passes through a second plate 15 that is disposed in such an inclined manner as to compensate the adverse astigmatism generated when the laser beam passes through the beam splitter 7, and is brought to the photodetector 16.

Here, when the reflective film 8 of the beam splitter 7 is a semi-transmission mirror, as to the laser beam that reaches the photodetector 16, a loss of the light that is returned toward the laser unit 1 becomes great. However, such an amount of laser light that there is practically no problem is secured due to the magnitude of the amount of the laser light emitted from each of the first and the second laser light sources 2 and 3, losses in the optical path, and the light-reception sensitivity of the photodetector 16. In this case, the return light to the laser unit 1 is controlled by the composite optical element 4, and thus, the increase of noises in the first and the second laser beams is prevented.

On the other hand, when the reflective film 8 of the beam splitter 7 is a polarizing filter, the laser beam that reaches the reflective film. 8 has been reflected twice by the reflective film 12 of the raising reflective mirror 11 in the outward path to the optical disc D and the return path therefrom, and has also been reflected once by the reflective film. 8 in the outward path. Therefore, to rotate by 90 degrees the direction of the linear polarization of each of the first and the second laser beams in the outward and the return paths, the angle is insufficient by the amount of the phase difference caused by the reflection by the reflective film 8. However, an S-polarized and linearly polarized laser beam in the outward path to the optical disc D becomes an elliptically polarized laser beam having a great P-polarization component in the return path, and is incident on the reflective film 8. When the reflective film 8 of the beam splitter 7 has such a film characteristic that the film allows a large portion (a little more than 90%) of a P-polarized laser beam to pass therethrough, as to the elliptically polarized laser beam which has a great P-polarization component and is returned to the beam splitter 7, the laser light amount thereof that is lost by the reflection by the reflective film 8 is suppressed, so that a large portion of the laser light passes through the reflective film 8 and reaches the photodetector 16.

Figure 3:
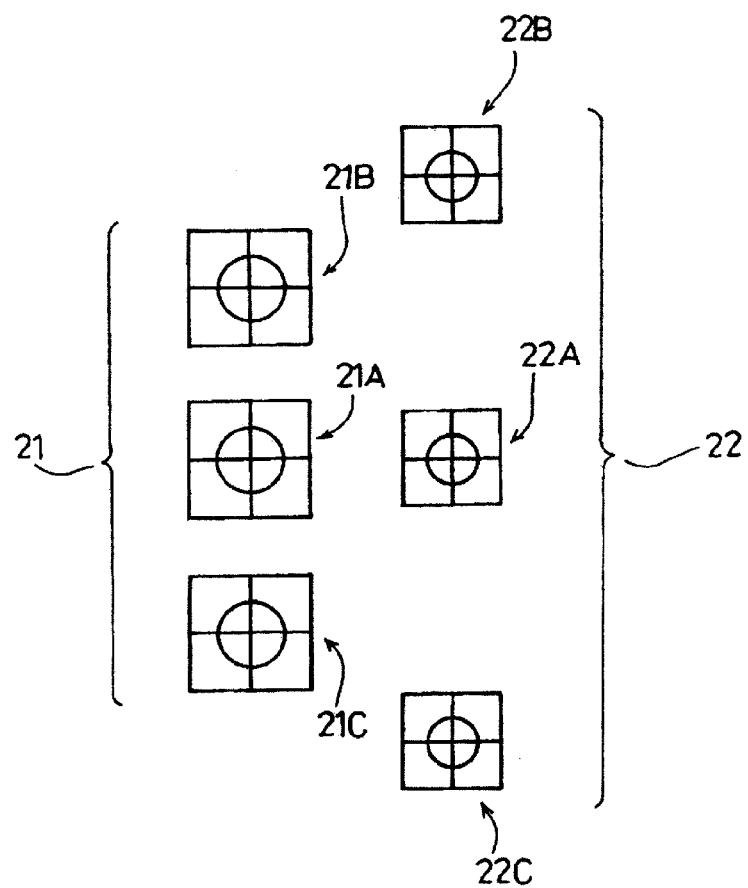
FIG. 3 is an explanatory view of light receiving units in a DVD light receiving area and a CD light receiving area of a photodetector.

As depicted in FIG. 3, the photodetector 16 includes a DVD light-receiving area 21 used for recording and reproducing to/from a DVD and a CD light-receiving area 22 used for recording and reproducing to/from a CD, which areas are formed and arranged on the same light-receiving face. In the DVD light-receiving area 21, a main light-receiving unit 21A, a front sub light-receiving unit 21B, and a rear sub light-receiving unit 21C are formed that respectively correspond to the three beams having the DVD compatible wavelength, that is, a main beam of zero-order light, a front sub and a rear sub beams of ±first-order diffracted light that are disposed in front of and at the back of the main beam. In the CD light-receiving area 22, a main light-receiving unit 22A, a front sub light-receiving unit 22B, and a rear sub light-receiving unit 22C are formed that respectively correspond to the three beams having the CD compatible wavelength, that is, a main beam of zero-order light, a front sub and a rear sub light beams of ±first-order diffracted light that are disposed in front of and at the back of the main beam.

The distances between light-receiving units in the DVD light-receiving area 21 corresponds to intervals of light spots of the three beams on the signal face of a DVD, respectively, and the distances between light-receiving units in the CD light-receiving area 22 corresponds to intervals of light spots of the three beams on the signal face of a CD, respectively.

The main light-receiving unit 21A, the front sub light-receiving unit 21B, and the rear sub light-receiving unit 21C in a DVD light-receiving area 21 and the main light-receiving unit 22A, the front sub light-receiving unit 22B, and the rear sub light-receiving unit 22C in a CD light-receiving area 22 in the photodetector 16 each are divided in a cross shape into four and are made up of four segments. The main light-receiving unit 21A, the front sub light-receiving unit 21B, and the rear sub light-receiving unit 21C in a DVD light-receiving area 21 each receive a light-receiving spot including a focus error component and a tracking error component that are effective for the direction of a dividing line of each light-receiving unit when the first laser beam emitted from the laser unit 1 is applied to the optical disc. The main light-receiving unit 22A, the front sub light-receiving unit 22B, and the rear sub light-receiving unit 22C in a CD light-receiving area 22 each receive a light-receiving spot including a focus error component and a tracking error component that are effective for the direction of a dividing line of each light-receiving unit when the second laser light emitted from the laser unit 1 is applied to the optical disc.

Therefore, a main information signal, a focus error signal, and a tracking error signal or a tilt error signal for recording and reproducing to/from a DVD may be obtained by performing predetermined operations for obtaining the various signals using light-receiving outputs obtained from the segments making up the main light receiving unit 21A, the front sub light receiving unit 21B, and the rear sub light receiving unit 21C of a DVD light-receiving area 21.

On the other hand, a main information signal, a focus error signal, and a tracking error signal for recording and reproducing to/from a CD may be obtained by performing predetermined operations for obtaining the various signals using light-receiving outputs obtained from the segments making up the main light receiving unit 22A, the front sub light receiving unit 22B, and the rear sub light receiving unit 22C of a CD light-receiving area 22.

Figures 4, 5:
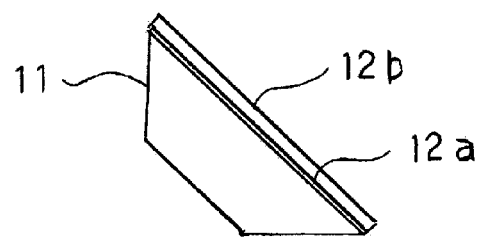
FIG. 4 is an explanatory view of an explanatory table of phase differences generated on a reflective film of a beam splitter and a reflective film of a raising reflective mirror, respectively.
FIG. 5 is an explanatory view of the reflective film of a raising reflective mirror.

In the first laser beam having a wavelength of 660 nm and the second laser beam having a wavelength of 784 nm, the reflective film 8 of the beam splitter 7 and the reflective film 12 of the raising reflective mirror 11 cause phase differences, respectively, as in a table shown in FIG. 4, for example.

In the case of FIG. 4, the phase differences caused in the first and the second laser beams by the reflective film 12 of the reflective mirror 11 are set at −107.80 degrees and −124.26 degrees such that relative to the phase differences 17.80 degrees and 34.26 degrees respectively of the first and the second laser beams caused by the reflective film 8 of the beam splitter 7, the phase differences of the first and the second laser beams that reach the optical disc D each become a quarter wavelength (±90 degrees, where the signs represent different rotation directions) for the first and the second laser beams respectively emitted from the first and the second laser light sources 2 and 3.

When the phase differences in the first and the second laser beams caused by the reflective film 8 of the beam splitter 7 are θ1 and θ2, assuming that the phase differences caused in the first and the second laser beams by the reflective film 12 of the reflective mirror 11 are X1 and X2, the phase differences θ1 and θ2 caused by the reflective film 8 of the beam splitter 7 and the phase differences X1 and X2 caused by the reflective film 12 of the reflective mirror 11 are set so as to satisfy θ1+X1=±90±15 [degrees] and θ2+X2=±90±15 [degrees]. The phase differences θ1, θ2, X1, and X2 each may be a positive or negative value and the signs "+" and "−" indicate the directions of the optical rotation of the circular polarization being clockwise and counterclockwise. "±15 degrees" is added taking into account variations in phase difference in the laser beam due to variations in parts, variations in temperature properties, variations in laser wavelength, etc.

As a result, the phase difference in each of the first and the second laser beams becomes a quarter wavelength by combining the phase difference caused by the reflective film 8 of the beam splitter 7 with the phase difference caused by the reflective film 12 of the reflective mirror 11.

Therefore, the necessary circular polarization ellipticity is secured of each of the first and the second laser beams to be applied to the optical disc D.

Figure 6:
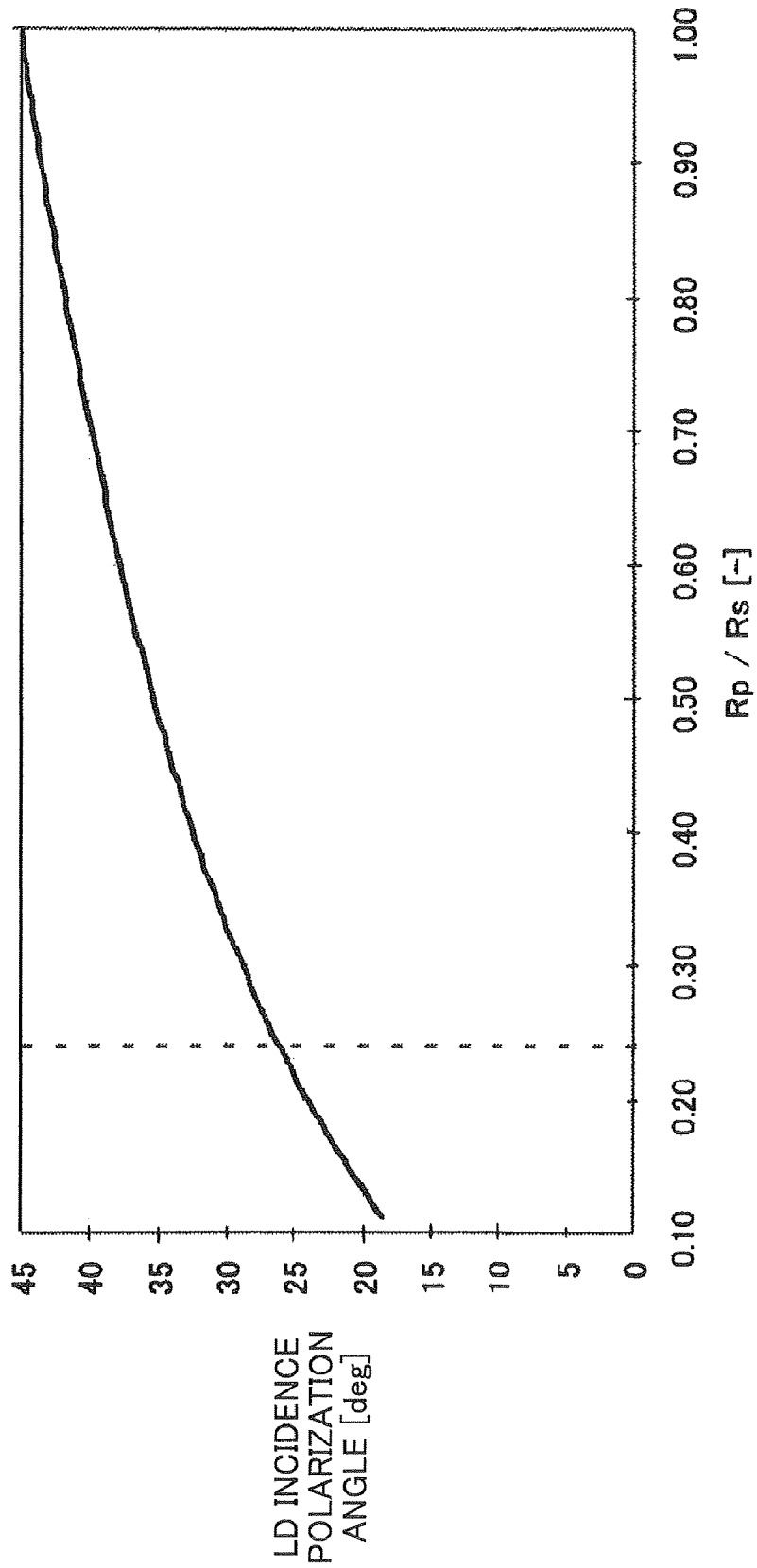
FIG. 6 is a characteristic graph of a condition for a laser beam applied to an optical disc D to satisfy a necessary circular polarization ellipticity.

FIG. 6 is a characteristic graph of a condition for the laser beam applied to the optical disc D to satisfy a necessary circular polarization ellipticity. In FIG. 6, the axis of ordinate represents the rotation angle (laser incidence polarization angle) of the direction of the linear polarization relative to the direction of the inclination of the reflecting surface of the reflective film 8 in the laser beam incident on the reflective film 8 of the beam splitter 7, and the axis of abscissa represents the reflectance ratio Rp/Rs of the reflectance Rp of the P-polarized light of the laser beam to the reflectance Rs of the S-polarized light of the laser beam incident on the reflective film 8.

Figure 8:
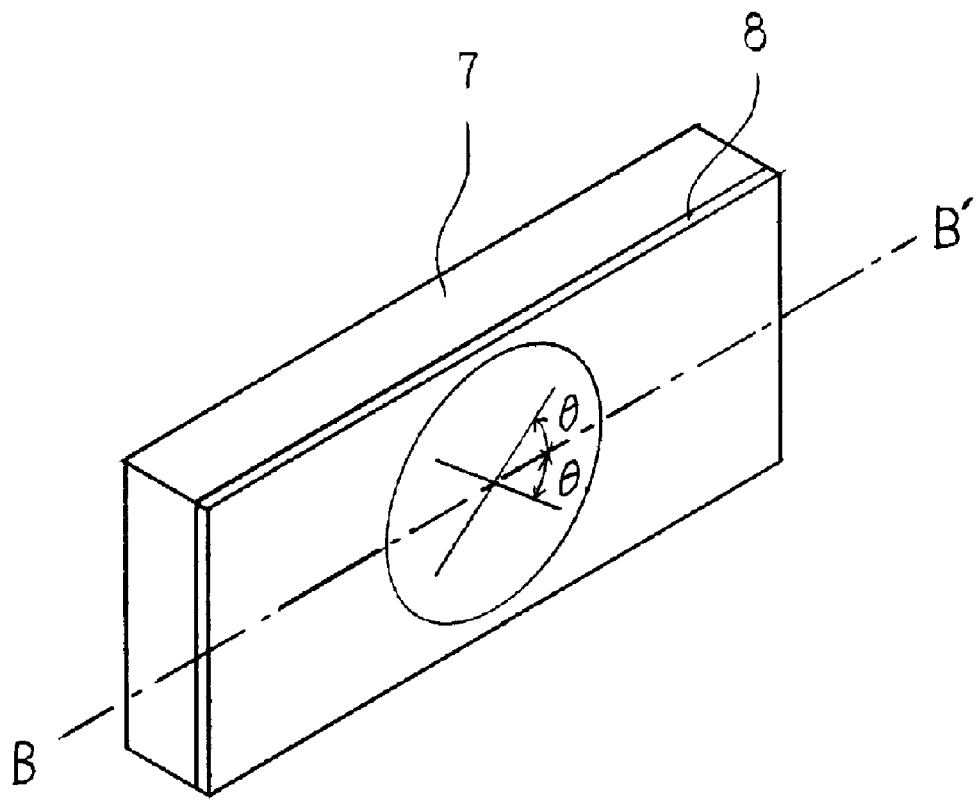
FIG. 8 is an explanatory view of a laser incidence polarization angle θ of a laser beam incident on a reflective film 8 of a beam splitter 7.

FIG. 8 is an explanatory view of the laser incidence polarization angle θ of the laser beam incident on the reflective film 8 of the beam splitter 7, and the laser incidence polarization angle θ represents an absolute value rotation angle between the direction of the linear polarization and the direction B-B' of the inclination of the reflecting surface of the reflective film 8.

A case where the laser incidence polarization angle and the reflectance ratio Rp/Rs exhibit a curve depicted in FIG. 6 indicates that the laser beam applied to the optical disc D satisfies the necessary circular polarization ellipticity.

When the reflectance ratio Rp/Rs of the S-polarized light and the P-polarized light in the reflective film 8 of the beam splitter 7 is 1.00, the necessary circular polarization ellipticity is satisfied by setting the laser incidence polarization angle at 45 degrees, however, the laser incidence polarization angle needs to be reduced to a value that is smaller than 45 degrees in the absolute value as the reflectance ratio Rp/Rs becomes smaller in order to satisfy the necessary circular polarization ellipticity.

Therefore, the circular polarization ellipticity of each of the first and the second laser beams applied to the optical disc D is secured by setting the laser incidence polarization angle that corresponds to the reflectance ratio Rp/Rs between the S-polarized light and the P-polarized light in the reflective film 8 of the beam splitter 7 in the direction of the linear polarization of each of the laser beams. When the reflective film 8 of the beam splitter 7 is a semi-reflective mirror, it is substantially not possible to set the reflectance ratio Rp/Rs between the S-polarized light and the P-polarized light at 1.00, and thus the laser incidence polarization angle is set at a predetermined angle that is smaller than the rotation angle of 45 degrees (absolute value) relative to the direction of the inclination of the reflecting surface of the reflective film 8 of the beam splitter 7 in order to satisfy the necessary circular polarization ellipticity.

That is, the circular polarization ellipticity of each of the first and the second laser beams applied to the optical disc D may be secured within a range of the reflectance ratio Rp/Rs<1.00 where the reflectance ratio Rp/Rs does not reach Rp/Rs=1.00 when the rotation angle is 45 degrees (absolute value) relative to the direction of the inclination of the reflecting surface of the reflective film 8 of the beam splitter 7.

On the other hand, in the optical pickup apparatus, the amount of laser light is an important requirement in addition to the circular polarization ellipticity of each of the first and the second laser beams applied to the optical disc D.

The beam splitter 7 reflects the first and the second laser beams that are emitted from the laser unit 1, to be brought to the main optical path, and directs these laser beams to the optical disc D; passes therethrough a portion of each of the first and the second laser beams, to be brought to the front monitor light-receiving detector 10; and passes therethrough the first and the second laser beams that have been reflected and returned by the optical disc D, to be brought to the photodetector 16.

Therefore, the spectral characteristic of the reflective film 8 of the beam splitter 7 is important in securing the necessary amount of laser light of each of the first and the second laser beams applied to the optical disc D.

In this case, the amount of laser light that passes through a portion of the reflective film 8 and is brought to the front monitor light-receiving detector 10, and the amount of laser light that is reflected by the optical disc D, passes through the reflective film 8, and is brought to the photodetector 16 are to be considered.

Figure 7:
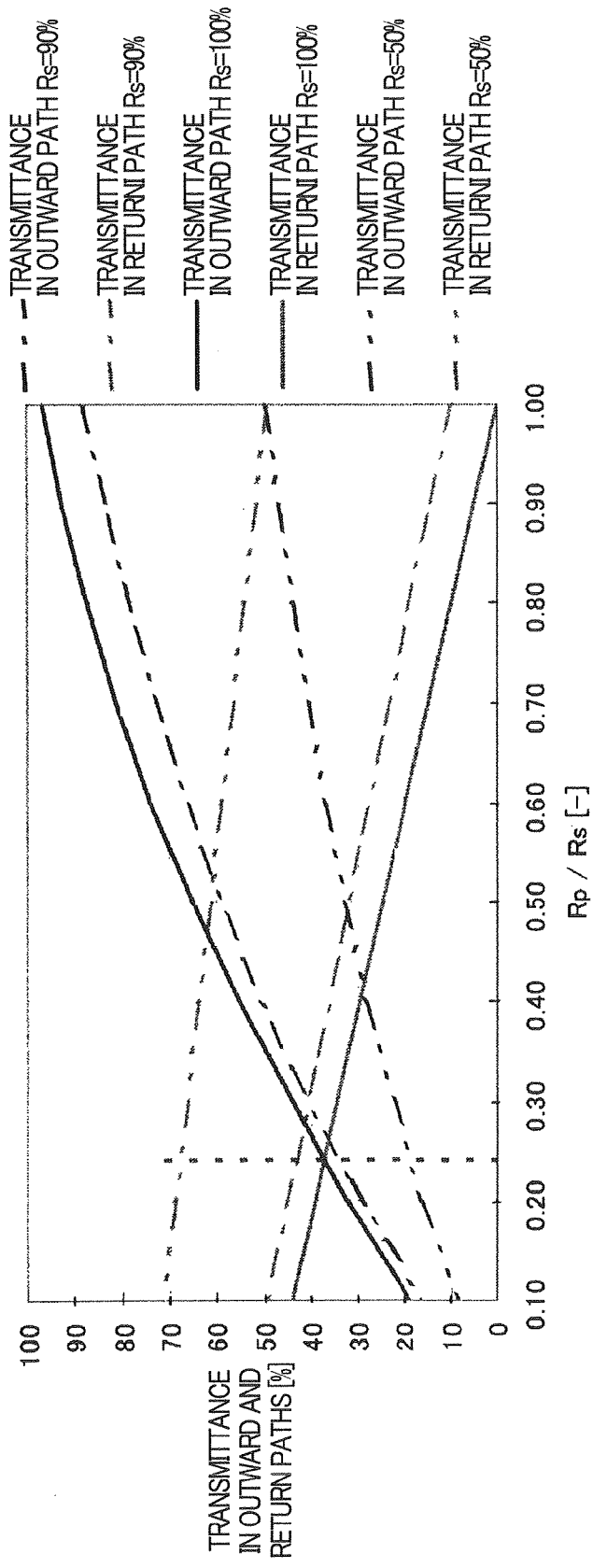
FIG. 7 is a characteristic graph of a spectral characteristic of a reflective film 8 of a beam splitter 7.

FIG. 7 is a characteristic graph of a spectral characteristic of the reflective film 8 of the beam splitter 7. In FIG. 7, the axis of ordinate represents the transmittance [%] of the combination of the S-polarized light and the P-polarized light in the outward and the return paths for the reflective film 8 of the beam splitter 7, and the axis of abscissa represents the reflectance ratio Rp/Rs of the reflectance Rs of the S-polarized light of the laser beam incident on the reflective film 8 and the reflectance Rp of the P-polarized light thereof.

In FIG. 7, a solid line that ascends as it goes rightward represents the transmittance in the outward path of the combination of the S-polarized light and the P-polarized light of the laser beam that is emitted from the laser unit 1, reflected by the reflective film 8, and brought to the main path, when the S-polarization reflectance Rs of the laser beam for the reflective film 8 of the beam splitter 7 is Rs=100%; and a solid line that descends as it goes rightward represents the transmittance in the return path of the combination of the S-polarized light and the P-polarized light of the laser beam that is reflected by the optical disc D, passes through the reflective film 8, and is brought to the photodetector 16, when the S-polarization reflectance Rs of the laser beam for the reflective film 8 of the beam splitter 7 is Rs=100%.

An alternate long and short dashed line that ascends as it goes rightward represents the transmittance in the outward path of the combination of the S-polarized light and the P-polarized light of the laser beam that is emitted from the laser unit 1, reflected by the reflective film 8, and brought to the main path, when the S-polarization reflectance Rs of the laser beam for the reflective film 8 of the beam splitter 7 is Rs=90%, and an alternate long and short dashed line that descends as it goes rightward represents the transmittance in the return path of the combination of the S-polarized light and the P-polarized light of the laser beam that is reflected by the optical disc D, passes through the reflective film 8, and is brought to the photodetector 16, when the S-polarization reflectance Rs of the laser beam for the reflective film 8 of the beam splitter 7 is Rs=90%.

An alternate long and two short dashed line that ascends as it goes rightward represents the transmittance in the outward path of the combination of the S-polarized light and the P-polarized light of the laser beam that is emitted from the laser unit 1, reflected by the reflective film 8 from the laser unit 1, and brought to the main path, when the S-polarization reflectance Rs of the laser beam for the reflective film 8 of the beam splitter 7 is Rs=50%, and an alternate long and two short dashed line that descends as it goes rightward represents the transmittance in the return path of the combination of the S-polarized light and the P-polarized light of the laser beam that is reflected by the optical disc D, passes through the reflective film 8, and is brought to the photodetector 16, when the S-polarization reflectance Rs of the laser beam for the reflective film 8 of the beam splitter 7 is Rs=50%.

As can be seen from the FIG. 7, as to the reflective film 8 of the beam splitter 7, the transmittance in the outward path of the combination of the S-polarized light and the P-polarized light of the laser beam becomes smaller as the S-polarization reflectance Rs of the laser beam becomes smaller, and the transmittance in the return path of the combination of the S-polarized light and the P-polarized light of the laser beam becomes greater as the S-polarization reflectance Rs of the laser beam becomes smaller.

Therefore, when the S-polarization reflectance Rs of the laser beam is set at Rs=100%, the intersection point of the transmittance in the outward path of the combination of the S-polarized light and the P-polarized light of the laser beam and the transmittance in the return path thereof is a point at which the reflectance ratio Rp/Rs is 0.24 and the transmittance in the outward path of the combination of the S-polarized light and the P-polarized light of the laser beam and the transmittance in the return path thereof each are 37%. At this intersection point of the transmittance in the outward path of the combination of the S-polarized light and the P-polarized light of the laser beam and the transmittance in the return path thereof, the reflectance ratio Rp/Rs becomes greater than 0.24 as the S-polarization reflectance Rs of the laser beam becomes smaller than 100%, and simultaneously, the transmittance in the outward path of the combination of the S-polarized light and the P-polarized light of the laser beam and the transmittance in the return path thereof each become greater than 37%. When the S-polarization reflectance Rs of the laser beam becomes smaller and is set at Rs=50%, the reflectance ratio Rp/Rs becomes substantially 1.00 and the transmittance in the outward path of the combination of the S-polarized light and the P-polarized light of the laser beam and the transmittance in the return path thereof each becomes substantially 50%.

The conditions for the characteristic graph depicted in FIG. 7 are that the transmittances of the collimating lens 9 and the objective lens 13, which are optical elements other than the reflective film 8 of the beam splitter 7 and the reflective film 12 of the raising reflective mirror 11, each are 100%; that the reflectances Rp and Rs of the reflective film 12 of the reflective mirror 11 for the S-polarized light and the P-polarized light of the laser beam each are 98%; and that the reflectance of the optical disc D is 100%.

The spectral characteristic of the reflective film 8 of the beam splitter 7 is set so as to satisfy the circular polarization ellipticity and the amount of laser light that are necessary for each of the first and the second laser beams applied to the optical disc D, considering the conditions depicted in the characteristic graphs of FIGS. 6 and 7.

Therefore, it is determined that the spectral characteristic of the reflective film 8 of the beam splitter 7 satisfies the circular polarization ellipticity and the amount of laser light that are necessary for each of the first and the second laser beams applied to the optical disc D, when the reflectance Rs of the S-polarized light of the incident laser beam and the reflectance ratio Rp/Rs between the reflectance Rs and the reflectance Rp of the P-polarized light of the laser beam satisfy following equations (a) and (b).

$$Rs > 50\% \quad (a)$$

$$0.24 \leq Rp/Rs < 1.00 \quad (b)$$

In this case, according to FIG. 6, when the reflectance ratio Rp/Rs is 0.24, the necessary circular polarization ellipticity may be obtained by allowing the laser beam, which has the direction of the linear polarization inclined at an angle of 26 degrees (absolute value) relative to the direction of the inclination of the reflecting surface of the reflective film 8 of the beam splitter 7, to be incident on the reflective film 8, that is, by setting the laser incidence polarization angle θ relative to the reflective film 8 at 26 degrees. Therefore, in order that the spectral characteristic of the reflective film 8 of the beam splitter 7 satisfies the necessary circular polarization ellipticity and the amount of laser light, a laser beam, which has the direction of the linear polarization inclined at an appropriate angle within a range of angles of 26 to 44 degrees (absolute value) relative to the direction of the inclination of the reflecting surface of the reflective film 8 of the beam splitter 7, may be incident on the reflective film 8. That is, the laser incidence polarization angle θ relative to the reflective film 8 is set at an appropriate angle within a range of angles of 26 and to degrees.

A configuration is made such that each of the first and the second laser beams applied to the optical disc D has the necessary circular polarization ellipticity by combining the phase difference caused by the reflective film 8 of the beam splitter 7 and the phase difference caused by the reflective film 12 of the raising reflective mirror 11. Therefore, the laser beam that is reflected by the reflective film 8 of the beam splitter 7 is incident on the reflective film 12 of the raising reflective mirror 11 in the elliptic polarization.

Here, the reflective film 12 of the reflective mirror 11 only has to have an action of causing total reflection, and therefore, the reflective film 12 may be formed such that the reflectances of the S-polarized light and the P-polarized light are substantially the same regardless of polarization of the laser beam.

Therefore, the setting of the direction of the linear polarization of the laser beam is considered only for the reflective film 8 of the beam splitter 7.

The reflective film 8 of the beam splitter 7 has such a film characteristic as to satisfy the above spectral characteristic, and thus it is difficult to allow both of the first and the second laser beams to have desired phase differences.

On the other hand, the reflective film 12 of the reflective mirror 11 essentially acts as a total reflection mirror that deflects the optical axis of each of the first and the second laser beams, which is a single function. Therefore, it is relatively easier for the reflective film 12 to set desired phase differences for the first and the second laser beams as compared to the reflective film 8 of the beam splitter 7.

In an specific example, white plate glass (for example, product name: B270 (from SCHOTT)) is used as a structural material of the base of the reflective mirror 11, a multi-layer film of $Ti_3O_5$ and $SiO_2$ is used between the most-reflecting surface and an intermediate layer of the reflective film 12, and then design of the film thickness and the number of stacked layers of the reflective film 12 allows the reflective film 12 to have arbitrary reflectance and phase difference.

FIG. 5 is an explanatory view of the configuration of the reflective film 12 of the raising reflective mirror 11. The reflective film 12 is made up by forming a film, which is a reflective-mirror function film 12a, on the inclined face of the base of the reflective mirror 11, and further forming or bonding a phase-difference function film 12b stacked thereon.

The reflective-mirror function film 12a and the phase-difference function film 12b of the reflective film 12 are respectively formed, using a metal material such as aluminum, chrome, or nickel-chrome which is suitable for the reflective-mirror function, and an organic material such as polycarbonate, polyvinylalcohol, cyclic-olefin polymer, or norbornene-series or liquid-crystal-coated type which is suitable for the phase-difference function, by a vacuum evaporation method such as a physical vapor deposition (PVD) method, a thin-film producing technique using a sputtering method, or a thin-film producing technique using a chemical vapor deposition (CVD) method, for example.

In forming the reflecting film 12, a method of applying a application-type phase-difference-plate material and performing heat treatment therefor, or bonding a phase-difference film onto the mirror face of the surface of the base of the reflective mirror 11 may also be considered.

Similarly to the reflective film 12 of the raising reflective mirror 11, the reflective film 8 of the beam splitter 7 is formed in the vacuum evaporation method such as PVD, the sputtering method, or CVD.

In the optical pickup apparatus depicted in FIG. 1, the orientation of the reflecting surface of the beam splitter 7 and the orientation of the reflective mirror 11 are set such that the optical axis of the laser beam incident on the beam splitter 7 and the optical axis of the laser beam emitted from the reflective mirror 11 cross each other at a substantially right angle.

The optical layout of the optical pickup apparatus is designed so as to be suitable for reduction in thickness thereof, due to the positional relationship between the beam splitter 7 and the reflective mirror 11 as above, and is further designed such that the phase difference is efficiently caused in each of the first and the second laser beams in the reflective film 8 of the beam splitter 7 and the reflective film 12 of the reflective mirror 11.

The optical pickup apparatus depicted in FIG. 1 is optically configured such that the direction of the linear polarization of each of the first and the second laser beams incident on the beam splitter 7 is set by the half-wave plate 6. Therefore, the direction of the linear polarization is set in a direction that is inclined at an appropriate angle within a range of angles of 26 to 44 degrees relative to the direction of the inclination of the reflecting surface of the reflective film 8 of the beam splitter 7, by setting the orientation of the rotation direction of the laser unit 1 considering the direction of the linear polarization of each of the first and the second laser beams emitted from the laser unit 1 and the rotation direction of the direction of the linear polarization of each of the first and the second laser beams by the half-wave plate 6. However, the half-wave plate 6 may be omitted from the optical system of the optical pickup apparatus depicted in FIG. 1, and the direction of the linear polarization of each of the first and the second laser beams emitted from the laser unit 1 may be set in the direction of the linear polarization that is directly inclined at an appropriate angle within range of angles of 26 to 44 degrees relative to the direction of the inclination of the reflecting surface of the reflective film 8 of the beam splitter 7 without the half-wave plate 6.

Here, as to the spot shape of the laser beam applied to the optical disc D, the direction of the long axis of the ellipse is set in a predetermined appropriate direction relative to a signal track in order to secure the quality of the signal to be read from the optical disc D. The spot shape of the laser beam is determined by a far-field pattern of each of the first and the second laser beams emitted from the laser unit 1. Therefore, when the direction of the linear polarization of the laser beam incident on the reflective film 8 of the beam splitter 7 is set in a direction at an appropriate angle relative to the direction of the inclination of the reflecting surface of the reflective film 8, and as to the spot shape of the laser beam applied to the disc D, when the direction of the long axis of the ellipse is set in the predetermined appropriate direction relative to the signal track, the orientation of the direction of the linear polarization of the laser beam and the orientation of the direction of the long axis of the ellipse of the spot shape of the laser beam may each independently be set by the half-wave plate 6. Therefore, the degree of freedom for the optical layout is higher in a case where the half-wave plate 6 is employed.

An example has been described using the multi-laser unit 1 that supports two wavelengths in a first embodiment. However, the optical configuration only has to be such that a plurality of laser beams having wavelengths different from each other are brought to a common optical path in the outward path to the optical disc, and pass through a diffraction grating that is disposed in the common optical path and that has respective diffraction functions for the laser beams. Otherwise, the optical configuration may also be such that using a beam splitter other than the beam splitter 7, laser units which emit the first and the second laser beams, respectively, are disposed on different optical paths, respectively, the first and the second laser beams are brought to the common optical path before the beam splitter 7 in the outward path, and thereafter the laser beams are brought to the beam splitter 7.

If the optical pickup apparatus supports laser beams having three wavelengths, such a configuration may be employed that uses a multi-laser unit supporting three wavelengths as the multi-laser unit 1.

<Second Embodiment>

In a first embodiment of the present invention as described above, the optical pickup apparatus having such a configuration is described that the necessary circular polarization ellipticity is set in the first and the second laser beams applied to the optical disc D by combining the phase difference caused by the reflective film 8 of the beam splitter 7 and the phase difference caused by the reflective film 12 of the raising reflective mirror 11. However, in a second embodiment of a second embodiment, such a configuration will be described that the necessary circular ellipticity is set in the first and the second laser beams applied to the optical disc D using the raising reflective mirror 11 alone.

In this case, the reflective film 12 of the raising reflective mirror 11 is configured to cause no phase difference and the reflective film 8 of the raising reflective mirror 7 is configured to cause the phase difference such that the necessary circular polarization ellipticity is set in the first and the second laser beams applied to the optical disc D.

The spectral characteristic of the reflective film 8 of the beam splitter 7 is set such that the necessary circular polarization ellipticity and amount of laser light are satisfied in each of the first and the second laser beams applied to the optical disc D on the same conditions as those in a first embodiment of the present invention.

That is, it is determined that the spectral characteristic of the reflective film 8 of the beam splitter 7 satisfies the circular polarization ellipticity and the amount of laser light that are necessary for each of the first and the second laser beams applied to the optical disc D, when the reflectance Rs of the S-polarized light of the incident laser beam and the reflectance ratio Rp/Rs between the reflectance Rs and the reflectance Rp of the P-polarized light of the laser beam satisfy the following equations (a) and (b).

$$Rs > 50\% \tag{a}$$

$$0.24 \leq Rp/Rs < 1.00 \tag{b}$$

In this case, the spectral characteristic that satisfies the necessary circular polarization ellipticity and amount of laser light in the reflective film 8 is obtained by allowing the laser beam, which has the direction of the linear polarization inclined at an angle in a range of angles of 26 to 44 degrees (absolute value) relative to the direction of the inclination of the reflecting surface of the reflective film 8 of the beam splitter 7, to be incident on the reflective film 8.

In a second embodiment of the present invention, the phase difference caused by the reflective film 12 of the raising reflective mirror 11 is not used, and thus, such an embodiment is suitable for an optical pickup apparatus having an optical configuration in which no reflective mirror 11 is used and reduction in thickness thereof is not supported.

The above embodiments of the present invention are simply for facilitating the understanding of the present invention and are not in any way to be construed as limiting the present invention. The present invention may variously be changed or altered without departing from its spirit and encompass equivalents thereof.

An embodiment of the present invention is employed not only in an optical pickup apparatus compatible with a DVD and a CD, but may be employed also in an optical pickup apparatus compatible with the Blu-ray Disc (trademark) standard that uses a laser beam having a wavelength in a blue-violet wavelength band of 400 nm to 420 nm (405 nm, for example).

What is claimed is:

1. An optical pickup apparatus, comprising:

a laser light source configured to emit a laser beam;

an objective lens configured to apply the laser beam to an optical recording medium;

a beam splitter including a first reflective film configured to reflect the laser beam so as to be directed to the objective lens, the beam splitter interposed in an optical path between the laser light source and the objective lens; and a reflective mirror including a second reflective film configured to reflect the laser beam so as to be directed to the objective lens, the reflective mirror interposed in an optical path between the beam splitter and the objective lens, wherein an incidence polarization angle of the laser beam relative to the first reflective film being set such that a P-polarization component is greater than an S-polarization component in linear polarization components of the laser beam incident on the first reflective film, and the first reflective film and the second reflective film cause a combined phase difference of substantially ±90 degrees in the laser beam emitted from the laser light source.

2. The optical pickup apparatus of claim 1, wherein a reflectance Rs of S-polarized light of the laser beam incident on the first reflective film is expressed by Rs>50%, and wherein a ratio Rp/Rs between a reflectance Rs of the S-polarized light and a reflectance Rp of P-polarized light of the laser beam incident on the first reflective film is expressed by $0.24 \leq Rp/Rs < 1.00$.

3. The optical pickup apparatus of claim 1, wherein the laser light source includes a first laser light source configured to emit a first laser beam having a first wavelength and a second laser light source configured to emit a second laser beam having a second wavelength different from the first wavelength, and wherein the first reflective film reflects toward the objective lens the first laser beam emitted from the first laser light source and the second laser beam emitted from the second laser light source, and allows reflected light beams of the first laser beam and the second laser beam reflected from the optical recording medium, to pass therethrough toward a photodetector.

4. The optical pickup apparatus of claim 3, wherein the first reflective film allows a portion of each of the first laser beam emitted from the first laser light source and the second laser beam emitted from the second laser light source, to pass therethrough toward a front monitor light-receiving detector, and wherein the front monitor light-receiving detector generates a light-receiving output corresponding to a laser light amount of each of the first laser beam and the second laser beam.

5. An optical pickup apparatus, comprising:

a laser light source configured to emit a laser beam;

an objective lens configured to apply the laser beam to an optical recording medium; and a beam splitter including a first reflective film configured to reflect the laser beam so as to be directed to the objective lens, the beam splitter interposed in an optical path between the laser light source and the objective lens, wherein an incidence polarization angle of the laser beam relative to the first reflective film being set such that a P-polarization component is greater than an S-polarization component in linear polarization components of the laser beam incident on the first reflective film, and the incidence polarization angle of the laser beam relative to the first reflective film is set at a rotation angle in a range of 26 to 44 degrees relative to a direction in which a reflecting surface of the first reflective film is inclined.

6. The optical pickup apparatus of claim 5, wherein the first reflective film causes a phase difference of substantially ±90 degrees in the laser beam.

\* \* \* \* \*